US009845412B2

(12) United States Patent
Meyer et al.

(10) Patent No.: US 9,845,412 B2
(45) Date of Patent: Dec. 19, 2017

(54) MULTI-LAYER BODY MADE OF POLYCARBONATE WITH HIGH WEATHERING RESISTANCE

(71) Applicant: Covestro Deutschland AG, Leverkusen (DE)

(72) Inventors: Alexander Meyer, Düsseldorf (DE); Vincenzo Taravella, Bergamo (IT); Gianmaria Malvestiti, Brembate (IT)

(73) Assignee: Covestro Deutschland AG, Leverkusen (DE)

( * ) Notice: Subject to any disclaimer, the term of this patent is extended or adjusted under 35 U.S.C. 154(b) by 283 days.

(21) Appl. No.: 14/654,692

(22) PCT Filed: Dec. 18, 2013

(86) PCT No.: PCT/EP2013/077063
§ 371 (c)(1),
(2) Date: Jun. 22, 2015

(87) PCT Pub. No.: WO2014/095981
PCT Pub. Date: Jun. 26, 2014

(65) Prior Publication Data
US 2016/0046838 A1 Feb. 18, 2016

(30) Foreign Application Priority Data
Dec. 20, 2012 (IT) .............. RM2012A0656

(51) Int. Cl.
B32B 27/00 (2006.01)
C09D 183/06 (2006.01)
C08J 7/04 (2006.01)
G02B 1/04 (2006.01)
B05D 5/06 (2006.01)
B05D 7/02 (2006.01)
B05D 7/00 (2006.01)
C08K 5/08 (2006.01)
C08K 5/3417 (2006.01)
C08K 5/3445 (2006.01)
C08K 5/3465 (2006.01)
B32B 27/36 (2006.01)
C08K 5/00 (2006.01)
G02B 5/22 (2006.01)
C08K 5/103 (2006.01)
C08K 5/18 (2006.01)

(52) U.S. Cl.
CPC .......... C09D 183/06 (2013.01); B05D 5/061 (2013.01); B05D 7/02 (2013.01); B05D 7/544 (2013.01); B05D 7/546 (2013.01); C08J 7/042 (2013.01); C08J 7/047 (2013.01); C08K 5/08 (2013.01); C08K 5/3417 (2013.01); C08K 5/3445 (2013.01); C08K 5/3465 (2013.01); G02B 1/04 (2013.01); B32B 27/365 (2013.01); C08J 2300/22 (2013.01); C08J 2369/00 (2013.01); C08J 2433/04 (2013.01); C08J 2475/04 (2013.01); C08J 2483/04 (2013.01); C08K 5/005 (2013.01); C08K 5/0041 (2013.01); C08K 5/103 (2013.01); C08K 5/18 (2013.01); G02B 5/223 (2013.01)

(58) Field of Classification Search
CPC ........... C08L 69/00; C08K 5/005; C08K 5/34; C08K 5/08; B32B 27/365
See application file for complete search history.

(56) References Cited

U.S. PATENT DOCUMENTS

| | | |
|---|---|---|
| 3,644,574 A | 2/1972 | Jackson et al. |
| 4,013,613 A | 3/1977 | Abolins et al. |
| 4,101,513 A | 7/1978 | Fox et al. |
| 4,185,009 A | 1/1980 | Idel et al. |
| 4,395,463 A | 7/1983 | Kray |
| 4,707,393 A | 11/1987 | Vetter |
| 5,041,313 A | 8/1991 | Patel |
| 5,235,026 A | 8/1993 | Wulff et al. |
| 5,288,778 A | 2/1994 | Schmitter et al. |
| 5,367,044 A | 11/1994 | Rosenquist |
| 5,391,795 A | 2/1995 | Pickett |
| 5,821,380 A | 10/1998 | Holderbaum et al. |
| 5,846,659 A | 12/1998 | Löwer et al. |
| 5,869,185 A | 2/1999 | Bahr et al. |
| 5,883,165 A | 3/1999 | Kröhnke et al. |

(Continued)

FOREIGN PATENT DOCUMENTS

| | | |
|---|---|---|
| DE | 10 31 512 B | 6/1958 |
| DE | 2 035 390 A1 | 1/1971 |

(Continued)

OTHER PUBLICATIONS

International Search Report for PCT/EP2013/077063 dated Feb. 10, 2014.

Primary Examiner — Rip A Lee
(74) Attorney, Agent, or Firm — Richard P. Bender

(57) ABSTRACT

Disclosed is a multi-layer body with high weathering resistance comprising (a) a substrate layer containing at least one thermoplastic polymer (b) one cover layer on at least one side of the substrate layer, characterized in that the substrate layer further contains: (a1) at 0.02 wt. % to 0.2 wt %, at least one colorant on the basis of anthraquinone of structure (1) or (2) with structure (1), R1 and R2 standing, independently of each other, for H, OH, OR5 NH2 and NHR5, R5 being selected from alkyl, cycloalkyl, phenyl and substituted and annulated phenyls, and R3 standing for H, alkyl, alkoxy, and R4 standing for H, OH and p-methylphenyl-NH—; and with structure (2): (a2) at 0.01 wt % to 1.00 wt. %, one or a plurality of demolders, and the cover layer consisting of a coating on the basis of polysiloxane or on the basis of polyacrylate or on the basis of polyurethane acrylate, containing at least one UV-absorber and having a layer thickness of 2-15 [mu]m.

15 Claims, No Drawings

(56) References Cited

U.S. PATENT DOCUMENTS

| | | | |
|---|---|---|---|
| 6,228,973 B1 | 5/2001 | McCloskey et al. | |
| 6,350,512 B1 | 2/2002 | Hurley et al. | |
| 6,355,723 B1 | 3/2002 | van Baal et al. | |
| 6,586,556 B2 | 7/2003 | Kratschmer et al. | |
| 6,613,869 B1 | 9/2003 | Horn et al. | |
| 7,425,358 B2 | 9/2008 | Heuer et al. | |
| 7,442,430 B2 | 10/2008 | Buckel et al. | |
| 7,547,755 B2 | 6/2009 | Heuer | |
| 8,044,122 B2 | 10/2011 | Ruediger et al. | |
| 8,968,610 B2* | 3/2015 | Meyer | C08K 5/0041 106/419 |
| 9,605,129 B2* | 3/2017 | Meyer | C08K 3/38 |
| 2004/0247878 A1 | 12/2004 | Imanaka et al. | |
| 2009/0212587 A1 | 8/2009 | Hobeika et al. | |
| 2011/0269896 A1 | 11/2011 | Wehrmann et al. | |
| 2011/0293921 A1* | 12/2011 | Meyer | C08K 3/38 428/323 |
| 2012/0157587 A1* | 6/2012 | Meyer | C08K 3/0033 524/88 |
| 2013/0113134 A1 | 5/2013 | Derluss et al. | |
| 2014/0322509 A1* | 10/2014 | Meyer | B32B 27/20 428/216 |
| 2015/0353712 A1* | 12/2015 | Meyer | C08K 3/0033 428/412 |
| 2015/0368434 A1* | 12/2015 | Meyer | C08K 3/0041 428/412 |

FOREIGN PATENT DOCUMENTS

| | | |
|---|---|---|
| DE | 2 248 242 A1 | 4/1973 |
| DE | 25 00 092 A1 | 7/1976 |
| DE | 2804283 A1 | 8/1978 |
| DE | 3121385 A1 | 8/1982 |
| DE | 42 40 313 A1 | 6/1994 |
| DE | 19 943 642 A1 | 3/2001 |
| DE | 10311063 A1 | 9/2004 |
| DE | 102007011069 A1 | 9/2008 |
| EP | 0 110 238 A2 | 6/1984 |
| EP | 0110221 A2 | 6/1984 |
| EP | 0 500 496 A1 | 8/1992 |
| EP | 0517044 A2 | 12/1992 |
| EP | 0 570 165 A2 | 11/1993 |
| EP | 0 716 919 A2 | 6/1996 |
| EP | 0839623 A1 | 5/1998 |
| EP | 1308084 A1 | 5/2003 |
| EP | 1506249 A1 | 2/2005 |
| EP | 1 582 549 A1 | 10/2005 |
| EP | 1865027 A1 | 12/2007 |
| GB | 1409275 | 10/1975 |
| GB | 1476108 A | 6/1977 |
| JP | S60188450 A | 9/1985 |
| JP | H11106518 A | 4/1999 |
| JP | 2003073557 A | 3/2003 |
| JP | 2005314461 A | 11/2005 |
| JP | 2011111589 A | 6/2011 |
| WO | WO-96/15102 A2 | 5/1996 |
| WO | WO-0226862 A1 | 4/2002 |
| WO | WO-03095521 A1 | 11/2003 |
| WO | WO-2005113639 A1 | 12/2005 |
| WO | WO-2006/108520 A1 | 10/2006 |
| WO | WO-2008037364 A1 | 4/2008 |
| WO | WO-2008/071363 A2 | 6/2008 |
| WO | WO-2008/109072 A1 | 9/2008 |
| WO | WO-2009030357 A1 | 3/2009 |
| WO | WO-2012007501 A1 | 1/2012 |

* cited by examiner

MULTI-LAYER BODY MADE OF POLYCARBONATE WITH HIGH WEATHERING RESISTANCE

CROSS-REFERENCE TO RELATED APPLICATIONS

This application is a national stage application (under 35 U.S.C. §371) of PCT/EP2013/077063, filed Dec. 18, 2013, which claims benefit of Italian Application No. RM2012A000656, filed Dec. 20, 2012, both of which are incorporated herein by reference in their entirety.

The present invention relates to dark-colored multilayer structures composed of polycarbonate, which feature high weathering stability. These multilayer structures also have a glass-like deep gloss effect. The invention also relates to a process and to compositions for producing these multilayer structures.

The multilayer structures are preferably formed from polycarbonate or polycarbonate blends. The polycarbonate blends may comprise further polymers, for example elastomers or graft polymers or further thermoplastics, for example polyester.

Particularly preferred blend partners are, for example, rubber-modified vinyl (co)polymers, for example ABS polymers (emulsion, bulk and suspension ABS), as described, for example, in DE-A 2 035 390 (=U.S. Pat. No. 3,644,574) or in DE-A 2 248 242 (=GB-A 1 409 275) and in Ullmanns, Enzyklopädie der Technischen Chemie [Encyclopedia of Industrial Chemistry], vol. 19 (1980), p. 280 ff. Also especially suitable as blend partners are polyesters such as polyethylene terephthalate or polybutylene terephthalate.

The invention further relates to the use of the inventive multilayer structures as panels for motor vehicle parts or as framework parts for multimedia housings.

There has to date been a lack of multilayer systems, especially multilayer polymer moldings, composed of polycarbonate which feature glass-like optical properties. These multilayer structures are especially suitable for motor vehicle exterior parts. They must have excellent surface quality and a deep gloss effect, but also excellent weathering stability. The applications include framework parts for glazing, for example sliding roofs. Because of the high lifetime for motor vehicles, especially in the field of high-value automobiles, it is important that the desired high-quality color impression—here the particularly black deep gloss effect—of the material is conserved over the duration of the service life without any significant losses.

These multilayer structures offer many advantages for use in the motor vehicle sector over conventional materials such as glass, for example. Examples of these include elevated breaking resistance and/or weight saving, which, in the case of automobiles, enable higher occupant safety in the event of traffic accidents and lower fuel consumption. Finally, materials containing thermoplastic polymers have a much greater design latitude because formability is easier.

Motor vehicle exterior parts which are used in the motor vehicle, rail vehicle and aerospace sectors and in the infrastructure sector must additionally have a longer lifetime and must not become brittle during this time. In addition, the color and gloss effect should change only insignificantly, if at all, over the lifetime. Furthermore, the thermoplastic parts must have excellent scratch resistance.

Because of the long lifetime required and because of the high surface quality and the deep gloss effect, the material used is frequently glass. Glass is insensitive to UV radiation and has low scratch sensitivity, and its mechanical properties do not change over long periods. Since the pigments used are inorganic oxides, for example iron oxide, there is virtually no change in the color properties even over long periods. However, it is not possible to use these pigments in thermoplastic materials, since this leads to degradation of the corresponding matrix.

Nevertheless, because of the advantages of plastics outlined above, there is a demand for materials having both the good physical properties of thermoplastics and the high surface quality, and also the desired deep gloss effect of corresponding black-colored glasses.

Among the transparent thermoplastics, for example, polymers based on polycarbonate and polymethylmethacrylate (PMMA) are of particularly good suitability for use as exterior parts for motor vehicle applications. Because of its high toughness, polycarbonate in particular has a very good profile of properties for end uses of this kind.

In order to improve the lifetime of thermoplastic materials, it is known that they can be provided with UV protection and/or scratch-resistant coatings. Furthermore, there is a large number of known colorants having high lightfastness.

In order to achieve a deep black for thermoplastic components, carbon black in particular is used according to the prior art. In particular, nanoscale carbon black is used, in order not to adversely affect the surface quality. It is also known that colorants can additionally be used in order to modify or to improve the black impression. However, carbon black frequently remains the main constituent of the formulation, since it has a high and homogeneous absorption in all regions of the visible spectrum. Moreover, carbon black also absorbs in the UV range and is therefore an effective means of UV protection.

However, it has been found that, in the case of multilayer structures, especially in the case of multilayer structures provided with a siloxane coating layer, carbon black-containing systems have an unfavorable effect on the weathering properties. However, the person skilled in the art would expect that carbon black would improve the weathering properties because of its UV-absorbent properties. This is also known and described in the prior art—for example in "Weatherability of Thermoplastic Piping" (www.plasicpipe.org) or in "Plastic Piping Systems", David, A. Chasis, Industrial Press Inc. New York 1988. The addition of carbon black significantly improves the lifetime of thermoplastic materials both in exterior weathering and in synthetic weathering.

Thus, it was most surprising that carbon black-containing color mixtures have an adverse effect on the weathering properties in multilayer structures composed of polycarbonate.

The lifetime of multilayer structures can be increased significantly through specific inventive formulations which are free of carbon black.

The carbon black-based thermoplastic compositions described in the prior art are only of inadequate suitability if an exceptionally high weathering stability together with high surface quality and high deep gloss effect and also a piano finish look is required. Especially for deep black components having a piano finish-like surface for exterior applications, which additionally have to fulfill high demands with regard to weathering performance, the prior art does not offer any possible solutions.

WO2012007501 describes a process for optimal incorporation of carbon black, in order to achieve a low level of surface defects. Components which are manufactured by this process, however, do not have the required weathering stability.

It is also possible to achieve a high-gloss surface by means of nanoscale or finely divided carbon polymorphs, for example carbon nanotubes, as described in WO 2009030357, or graphite, as shown in JP 2003073557. However, a certain undesirable surface roughness is imparted to the injection molding via the rod- or platelet-like shape of the particles.

It is known that black components or dark-colored components can be produced by means of polymer compositions containing particular colorants.

For instance, U.S. Pat. No. 6,355,723 describes dark-colored polymer compositions having a gloss effect. These are particularly suitable for metallization.

JP 60188450 describes dark-colored molding compositions having low transmission in the visual range and high transmission in the IR range.

None of these documents describes multilayer structures having the high weathering stability required in accordance with the invention, or gives any pointers to the achievement of the present object.

Black components having a piano finish look, consisting of specific polycarbonate/polyester mixtures, are described in JP2011111589. However, different compositions are described as compared with the present invention. JP2011111589 does not give any information at all with regard to the weathering stability of these compositions, nor does it describe multilayer structures.

Black molding compositions having high weathering stability and good surface properties are described in JP 2005314461 or in JP 11106518, these having particular carbon black contents. However, it has been found in the context of the present invention that such compositions do not have the required high weathering stability in relation to multilayer structures. Moreover, the compositions relate to specific blends which do not form part of the subject matter of the present application.

Rubber-containing systems generally have different weathering stability as compared with polycarbonate.

In order to avoid the above-described disadvantages which are caused by addition of carbon black or other carbon polymorphs in polymer compositions, it is possible to use soluble dyes in order to achieve high surface gloss—like a piano finish look. However, a disadvantage of this solution is that the dyes have to be used in a relatively high concentration, which leads to problems in the process of painting the components, since the dyes present in high concentration are leached readily out of the surface of the molding by the paint solvents. This causes gradual coloring of the paint solution. It is therefore important to maintain low concentrations of soluble dyes.

A further disadvantage in the case of utilization of organic dyes is bleaching by UV irradiation, such that the color impression changes with time.

The problem addressed was therefore that of developing a black multilayer structure having a light transmission (Ty) of less than 1.0%, preferably less than 0.5%, further preferably less than 0.2%, even further preferably less than 0.1% and especially preferably 0.0%, composed of a thermoplastic material—preferably composed of polycarbonate—which combines excellent surface quality with high deep gloss and a piano finish-like black impression with high weathering resistance, and is suitable for framework parts in the motor vehicle sector or for multimedia housings, for example television housings or the like, which are subjected to UV stress.

Surprisingly, the problem was solved by specific multilayer polymer moldings which contain a substrate material comprising specific colorants and have UV resistance and scratch resistance. It has been found that only very particular colorant mixtures are suitable in combination with a specific transparent coating layer for achieving the desired deep gloss effect and the desired weathering stability. This was all the more surprising in that colorants having inadequate weathering performance in transparent formulations are used.

Such a shaped body shows, in an Xe weathering test to ASTM G155 (0.75 W/m² nm at 340 nm), no discoloration and no defects in the coating layer after 5000 hours, preferably after 6000 h, of weathering time.

The inventive multilayer structure comprises:
a) at least one substrate layer containing at least one thermoplastic polymer,
b) at least one outer layer at least on one side of the substrate layer.

The thermoplastic polymer in the substrate layer a) is preferably a polycarbonate.

In a particular embodiment, the substrate layer a) consists of a polycarbonate blend comprising polycarbonate and rubber-modified vinyl (co)polymers, for example ABS polymers, or polyesters such as polyethylene terephthalate or polybutylene terephthalate.

Especially preferred is a polycarbonate having a melt volume flow rate of 6 to 35 cm³/(10 min), preferably 6 cm³/(10 min) to 25 cm³/(10 min), especially preferably 9 to 21 cm³/(10 min), to ISO 1133 (at 300° C. and a load of 1.2 kg).

Preferably, the substrate layer a) has a light transmission of less than 1.0%, preferably less than 0.5%, further preferably less than 0.2%, even further preferably less than 0.1% and especially preferably 0.0%.

The substrate layer a) comprises, as well as the thermoplastic polymer, such that the other components add up to 100% by weight, the following components (A) to (D):
A) at least one, preferably two, anthraquinone-based colorant(s). Additionally mixtures comprising an anthraquinone-based colorant, more preferably an anthraquinone-based colorant of the structure (1) and/or (2), with at least one further anthraquinone-based dye, especially preferably selected from the structures (1), or at least one further perinone-based colorant having a molecular weight of less than 450 g/mol, preferably based on the structure (3) or (4) or with at least one phthalocyanine-based colorant, especially preferably based on structures (5a) or (5b) or at least one indanthrene-based colorant of the structure (6), or at least one further colorant based on a pyrazole derivative, especially preferably based on structure (7). In addition to this inventive colorant mixture, it is optionally possible to use further colorants in addition.

In each of these combinations, however, the presence of at least one anthraquinone-based colorant, especially preferably of the structure (1) and/or (2), is obligatory.

The inventive anthraquinone-based colorants have the structure (1) or (2).

Structure (1)

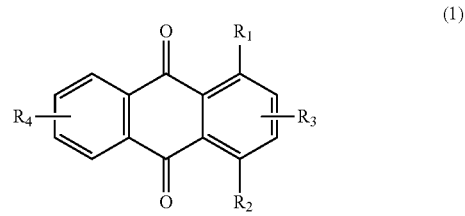

(1)

where R1 and R2 are each independently H, OH, OR$^5$, NH$_2$ and NHR$^5$, where R$^5$ comprises alkyl, cycloalkyl, phenyl and substituted and fused phenyls.

Preferably, R1 and R2 are each independently H, OH, NH$_2$ and NHR$^5$, where R$^5$ is further preferably an unsubstituted or substituted phenyl radical, more preferably

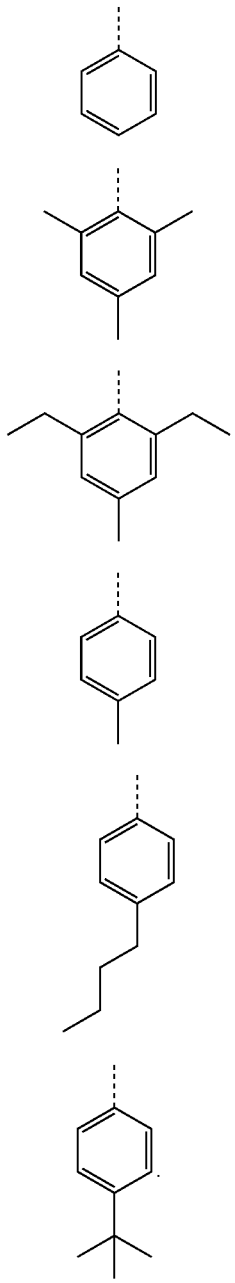

(1a)
(1b)
(1c)
(1d)
(1e)
(1f)

R3 is H; alkyl, preferably methyl, ethyl, propyl, butyl, isobutyl and tert-butyl; alkoxy, preferably methoxy, ethoxy, propyloxy, butoxy, isobutoxy and tert-butoxy; and phenyloxy; especially preferably H and phenyloxy, and R4 is H, OH and p-methylphenyl-NH—.

Structure (2):

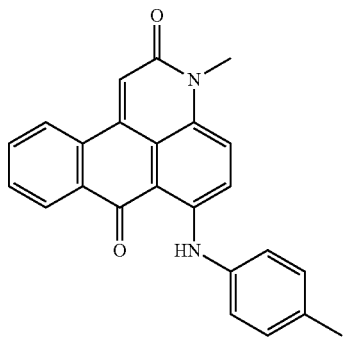

(2)

Colorants of the structure (2) are known, for example, as Solvent Red 52 and are available under the Macrolex Red 5B trade name from Lanxess AG.

Structures (3) to (7):

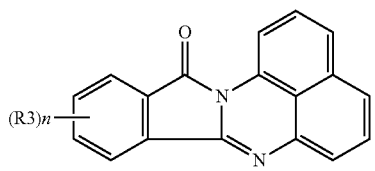

(3)

where R3 is preferably halogen, especially preferably Cl, where n is an integer of 0-4 and, more preferably, n=4. A further preferred embodiment is one with n=0, and so all the substituents on the ring in this case are H.

Colorants of this kind are available, for example, as Macrolex® Orange 3G or Macrolex® Red EG from Lanxess AG.

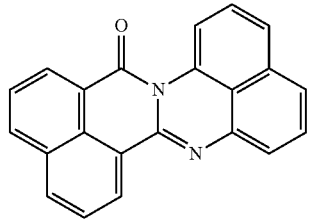

(4)

Colorants of this kind are available, for example, under the Macrolex® Red E2G trade name from Lanxess AG.

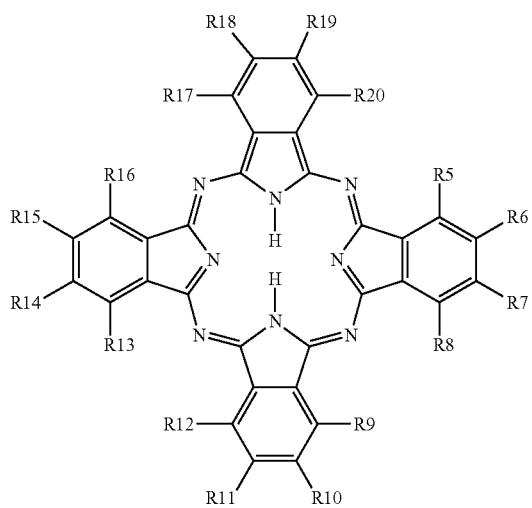

(5a)

(5b)

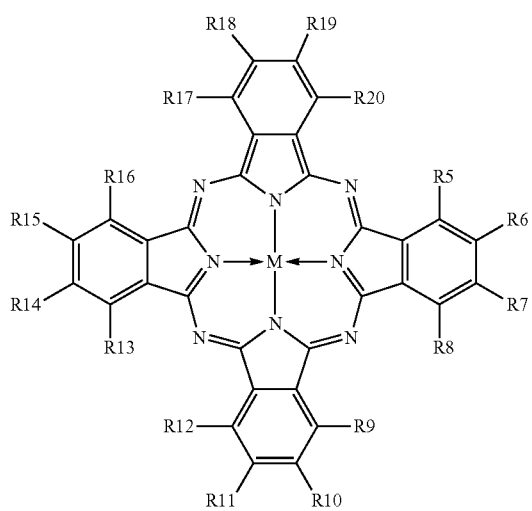

The R(5-20) radicals are each independently hydrogen, methyl, ethyl, propyl, isopropyl, butyl, isobutyl, tert-butyl, pentyl, neopentyl, hexyl, thexyl, fluorine, chlorine, bromine, sulfone, CN.

Preferably, R(5-20) is the same in all positions. Further preferably, R(5-20) is H in all positions. In an alternative embodiment, R(5-20) is Cl in all positions.

M is preferably aluminum (with R=H: aluminum phthalocyanine, CAS: 14154-42-8), nickel (with R=H: nickel phthalocyanine, CAS: 14055-02-8), cobalt (with R=H: cobalt phthalocyanine, CAS: 3317-67-7), iron (with R=H: iron phthalocyanine, CAS: 132-16-1), zinc (with R=H: zinc phthalocyanine, CAS: 14320-04-08), copper (with R=H: copper phthalocyanine, CAS: 147-14-8; with R=H and Cl: polychlorocopper phthalocyanine, CAS: 1328-53-6; with R=Cl: hexadecachlorophthalocyanine, CAS: 28888-81-5; with R=Br: hexadecabromophthalocyanine, CAS: 28746-04-5), manganese (with R=H: manganese phthalocyanine, CAS: 14325-24-7).

Especially preferred is the combination of M=Cu and R=H for all positions. For instance, a compound of the structure (5b) with M=Cu and R(5-20)=H is available as Heliogen® Blue K 6911D or Heliogen® Blue K 7104 KW from BASF AG, Ludwigshafen.

Compounds of the structure (5a) are available, for example, as Heliogen® Blue L 7460 from BASF AG, Ludwigshafen.

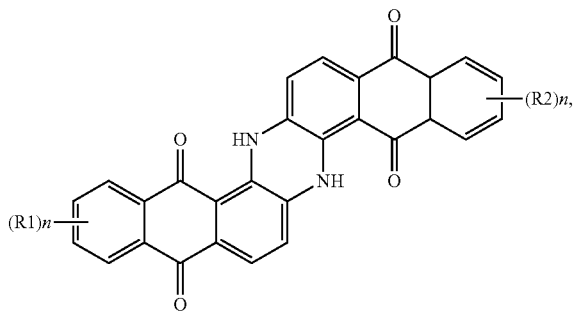

(6)

where

R1 and R2 are each independently a linear or branched alkyl radical or halogen, preferably methyl, ethyl, propyl, isopropyl, butyl, isobutyl, tert-butyl, pentyl, neopentyl, hexyl, thexyl, or Cl, further preferably methyl, Cl and more preferably Cl, n is a natural number from 0 to 4.

In a particularly preferred embodiment, n=0 in all rings, and so all R1 and R2=H.

Colorants of this structure (6) are commercially available as the Paliogen Blue series from BASF AG.

When colorants of the structure (6) are used, preference is given especially to the pigments having a bulk volume (determined to DIN ISO 787-11) of 2 l/kg-10 l/kg, preferably 3 l/kg-8 l/kg, a specific surface area (determined to DIN 66132) of 5 m$^2$/g-60 m$^2$/g, preferably 10 m$^2$/g-55 m$^2$/g, and a pH (determined to DIN ISO 787-9) of 4-9.

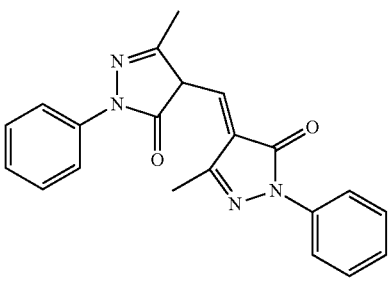

(7)

Colorants of the structure (7) are available, for example, under the Macrolex Yellow 3 g trade name from Lanxess.

Especially preferred among the anthraquinone-based colorants of the structure (1) are the following structures:

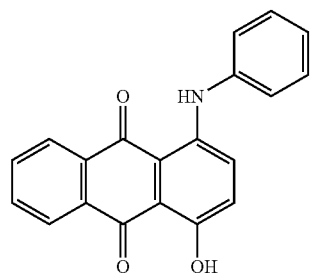
(1A)

Colorants of this kind are known as Disperse Violet 103 (Color Index 60724; CAS 19286-75-0).

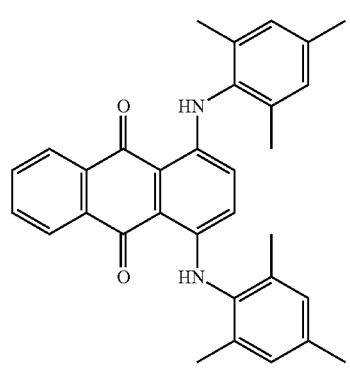
(1B)

Colorants of the structure (1B) are available, for example, under the Keyplast Blue KR trade name.

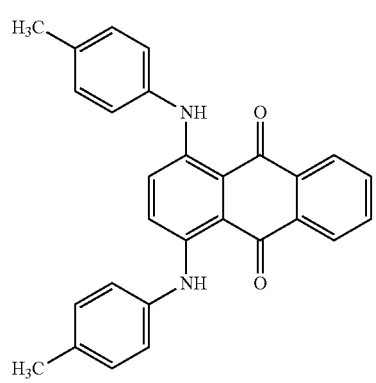
(1C)

The colorants of the structure (1C) are available, for example, under the Macrolex Green 5B trade name from Lanxess AG.

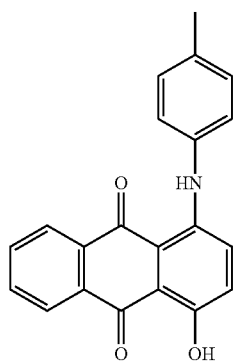
(1D)

Colorants of the formula (1D) are available, for example, under the Macrolex Violet B trade name from Lanxess AG.

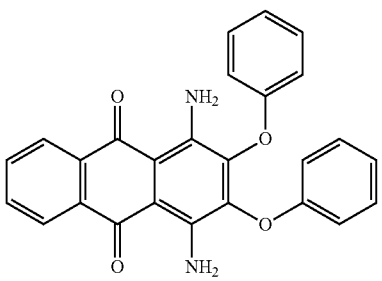
(1E)

The colorants of the formula (1E) are available, for example, under the Macrolex Red Violet R trade name from Lanxess AG.

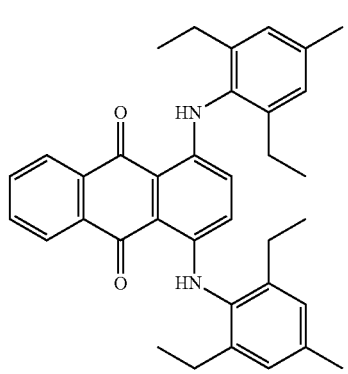
(1F)

The colorants of the formula (1F) are available, for example, under the Macrolex Blue RR trade name from Lanxess AG.

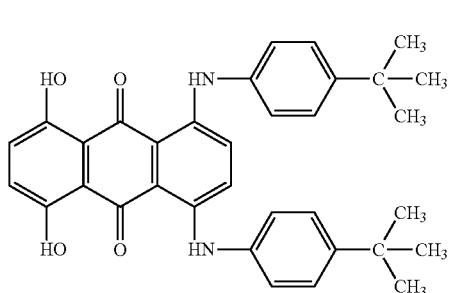
(1G)

The colorants of the formula (1G) are available, for example, under the Macrolex Green G trade name from Lanxess AG.

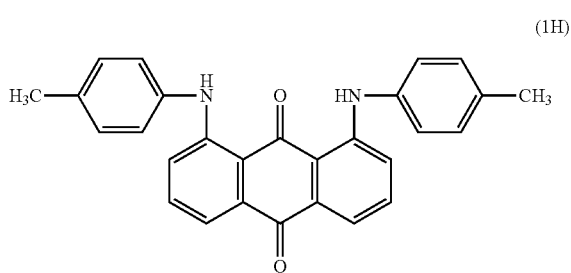

(1H)

The colorants of the formula (1H) are available, for example, under the Macrolex Violet 3R trade name from Lanxess AG.

In a preferred embodiment, the substrate layer is free of carbon black. In a preferred embodiment, the substrate layer is free of perinone-based dyes (e.g. structure 3).

In a preferred embodiment, the substrate layer comprises at least one colorant selected from the formulae (1H).

In a very particularly preferred embodiment, the substrate layer comprises a combination of colorants of the structure (1C) with at least one colorant of the structures (1H), (1G), (1D) and (2).

Preferably, each of the colorants is used in a concentration of 0.02% to 0.2% by weight, preferably of 0.05% to 0.15% and especially preferably of 0.08% to 0.13% by weight. The thickness of the respective extrudate or injection molding is 0.01 mm to 10 mm, preferably 0.1 to 9 mm, especially preferably 1 to 8 mm and most preferably 2 to 6 mm.

Preferred embodiments specified in the context of present invention may be on their own or in combination with other preferred embodiments.

B) The substrate layer comprises demolding agents based on a fatty acid ester, preferably a stearic ester, especially preferably based on pentaerythritol.

In a particular embodiment, pentaerythritol tetrastearate (PETS) and/or glycerol monostearate (GMS) is used. 0.01% by weight to 1.0% by weight, preferably 0.01% by weight to 0.50% by weight, more preferably 0.05% by weight to 0.40% by weight, of one or more demolding agents is used.

C) The base layer optionally comprises a thermal stabilizer. In a preferred embodiment, the polymer composition of the base layer comprises at least one thermal stabilizer or processing stabilizer. Suitable with preference are phosphites and phosphonites, and also phosphines. Examples are triphenyl phosphite, diphenyl alkyl phosphite, phenyl dialkyl phosphite, tris(nonylphenyl) phosphite, trilauryl phosphite, trioctadecyl phosphite, distearylpentaerythritol diphosphite, tris(2,4-di-tert-butylphenyl) phosphite, diisodecylpentaerythritol diphosphite, bis(2,4-di-tert-butylphenyl)pentaerythritol diphosphite, bis(2,4-dicumylphenyl)pentaerythritol diphosphite, bis(2,6-di-tert-butyl-4-methylphenyl)pentaerythritol diphosphite, diisodecyloxypentaerythritol-diphosphite, bis(2,4-di-tert-butyl-6-methylphenyl)pentaerythritol diphosphite, bis(2,4,6-tris(tert-butylphenyl)pentaerythritol diphosphite, tristearylsorbitol triphosphite, tetrakis(2,4-di-tert-butylphenyl)-4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl)methyl phosphite, bis(2,4-di-tert-butyl-6-methylphenyl)ethyl phosphite, 6-fluoro-2,4,8,10-tetra-tert-butyl-12-methyl-dibenz[d,g]-1,3,2-dioxaphosphocin, 2,2',2"-nitrilo[triethyl tris(3,3',5,5'-tetra-tert-butyl-1,1'-biphenyl-2,2'-diyl) phosphite], 2-ethylhexyl (3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane, bis(2,6-di-tert-butyl-4-methylphenyl)pentaerythritol diphosphite, triphenylphosphine (TPP), trialkylphenylphosphine, bis-diphenylphosphinoethane or a trinaphthylphosphine. Especially preferably, triphenylphosphine (TPP), Irgafos® 168 (tris(2,4-di-tert-butylphenyl) phosphite) and tris(nonylphenyl) phosphite or mixtures thereof are used.

In addition, it is possible to use phenolic antioxidants such as alkylated monophenols, alkylated thioalkylphenols, hydroquinones and alkylated hydroquinones. Particular preference is given to using Irganox® 1010 (pentaerythritol 3-(4-hydroxy-3,5-di-tert-butylphenyl)propionate; CAS: 6683-19-8) and Irganox 1076® (2,6-di-tert-butyl-4-(octadecanoxycarbonylethyl)phenol).

In a specific embodiment of the present invention, the inventive phosphine compounds are used together with a phosphite or a phenolic antioxidant or a mixture of the two latter compounds.

The thermal stabilizers are used in amounts of 0.00% by weight-0.20% by weight, preferably 0.01% by weight-0.10% by weight, further preferably of 0.01% by weight to 0.05% by weight, and especially preferably of 0.015% by weight to 0.040% by weight.

In addition, phosphate-based processing stabilizers may be present in the substrate layer. The phosphate here preferably has the following structure (8):

(8)

where R1 to R3 may be H or identical or different, linear, branched or cyclic alkyl radicals. Particular preference is given to C1-C13 alkyl radicals. C1-C18-Alkyl is, for example, methyl, ethyl, n-propyl, isopropyl, n-butyl, sec-butyl, tert-butyl, n-pentyl, 1-methylbutyl, 2-methylbutyl, 3-methylbutyl, neopentyl, l-ethylpropyl, cyclohexyl, cyclopentyl, n-hexyl, 1,1-dimethylpropyl, 1,2-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, l-ethylbutyl, 2-ethylbutyl, 1,1,2-trimethylpropyl, 1,2,2-trimethylpropyl, 1-ethyl-1-methylpropyl, 1-ethyl-2-methylpropyl or l-ethyl-2-methylpropyl, n-heptyl and n-octyl, pinacyl, adamantyl, the isomeric methyls, n-nonyl, n-decyl, n-dodecyl, n-tridecyl, n-tetradecyl, n-hexadecyl or n-octadecyl.

Alkyl phosphates suitable in accordance with the invention are, for example, mono-, di- and trihexyl phosphate, triisooctyl phosphate and trinonyl phosphate. The alkyl phosphate used is preferably triisooctyl phosphate (tris-2-ethylhexyl phosphate). It is also possible to use mixtures of various mono-, di- and trialkyl phosphates.

The processing stabilizers used are used in amounts of less than 0.0500% by weight, preferably of 0.00005% by weight to 0.05000% by weight, more preferably 0.0002 to 0.0500% by weight, even more preferably of 0.0005% by weight to 0.0300% by weight and, in a very preferred case, of 0.001% by weight to 0.0120% by weight, based on the total weight of the composition.

In the substrate layer, the use of phosphates of the structure (8) and especially of triphenylphosphine is especially preferred.

D) Optionally 0.0% by weight to 20.00% by weight, preferably from 0.05% by weight to 10.00% by weight, further preferably from 0.10% by weight to 1.00% by weight, even further preferably 0.10% by weight to 0.50% by weight and most preferably 0.10% by weight to 0.30% by weight of at least one or more than one UV absorber(s), based on the total amount of UV absorbers; optionally 0.000/% by weight to 20.00% by weight, preferably from 0.05% by weight to 10.00% by weight, further preferably from 0.10% by weight to 1.00% by weight, even further preferably 0.10% by weight to 0.50% by weight and most preferably 0.10% by weight to 0.30% by weight of at least one UV absorber.

Suitable UV absorbers are described, for example, in EP 1 308 084 A1, in DE 102007011069 A1 and in DE 10311063 A1; particularly suitable ultraviolet absorbers are hydroxy-benzotriazoles such as 2-(3',5'bis-(1,1-dimethylbenzyl)-2'-hydroxyphenyl)benzotriazole (Tinuvin® 234, Ciba Spezialitätenchemie, Basle), 2-(2'-hydroxy-5'-(tert-octyl)phenyl)-benzotriazole (Tinuvin® 329, Ciba Spezialitätenchemie, Basle), 2-(2'-hydroxy-3'-(2-butyl)-5'-(tert-butyl)phenyl)benzotriazole (Tinuvin® 350, Ciba Spezialitätenchemie, Basle), bis-(3-(2H-benzotriazolyl)-2-hydroxy-5-tert-octyl)methane, (Tinuvin® 360, Ciba Spezialitätenchemie, Basle), (2-(4,6-diphenyl-1,3,5-triazin-2-yl)-5-(hexyloxy)phenol (Tinuvin® 1577, Ciba Spezialitätenchemie, Basle), and the benzophenones 2,4-dihydroxybenzophenone (Chimasorb® 22, Ciba Spezialitätenchemie, Basle) and 2-hydroxy-4-(octyloxy)benzophenone (Chimassorb® 81, Ciba. Basle), 2-propenoic acid, 2-cyano-3,3-diphenyl-, 2,2-bis[[(2-cyano-1-oxo-3,3-diphenyl-2-propenyl)oxy]methyl]-1,3-propanediyl ester (9C1) (Uvinul® 3030, BASF AG Ludwigshafen), 2-[2-hydroxy-4-(2-ethylhexyl)oxy]phenyl-4,6-di(4-phenyl)phenyl-1,3,5-triazine (CGX INA 006, Ciba Spezialitätenchemie, Basle) or tetraethyl 2,2'-(1,4-phenylene-dimethylidene)bismalonate (Hostavin® B-Cap, Clariant AG). It is also possible to use mixtures of these ultraviolet absorbers.

Optionally, the base layer contains 0.0% by weight to 5.0% by weight, preferably 0.01% by weight to 1.00% by weight, of at least one further additive. The further additives are customary polymer additives, as described, for example, in EP-A 0 839 623, WO-A 96/15102, EP-A 0 500 496 or "Plastics Additives Handbook", Hans Zweifel, 5th Edition 2000, Hanser Verlag, Munich, for example flame retardants, antistats or flow improvers. The components already mentioned for the base layer are explicitly excluded in this context.

The amounts stated above are each based on the overall polymer composition.

In a particularly preferred embodiment, the base layer consists of bisphenol A-based polycarbonate containing only components A), B) and C).

Outer Layer b)

The outer layer b) consists of a polysiloxane-based or polyacrylate-based or polyurethane acrylate-based, preferably polysiloxane-based, coating comprising
i. at least one UV absorber, where
ii. the thickness of the outer layer is from 2 to 15 µm, especially preferably from 4.0 to 12.0 µm.

In a further preferred embodiment, at least one adhesion-promoting layer (primer layer) disposed on the base layer is disposed between the base layer and the outer layer, the primer layer thickness being 0.3 to 8 µm, especially preferably 1.1 to 4.0 µm.

In a still further-preferred embodiment, an adhesion-promoting layer and an outer layer are applied to both sides of the base layer.

The UV absorber in the outer layer may be a UV absorber selected from the group of those mentioned under d), preferably together with at least one UV absorber from the class of the benzophenones, especially preferably 4,6-dibenzoyl-2-(3-triethoxysilylpropyl)resorcinol.

Preferably, UV absorbers are present in the outer layer and in the primer layer—in the base layer, in contrast, the presence of the UV absorber is optional.

The concentration of the UV absorber or the UV absorber mixture in the outer layer is between 1% and 30% by weight, preferably between 5% by weight and 20% by weight.

The appearance of depth is achieved by a multilayer structure comprising a substrate layer comprising the inventive combination of the dyes, and having a primer layer of specific thickness and scratch resistance made from polysiloxane coating material. Only the combination of these components and properties makes it possible to achieve such an effect.

Only through the use of the specific composition for the substrate layer a) in combination with that of the outer layer b) can the desired excellent weathering resistance be achieved.

The inventive multilayer structures are suitable, for example, for black panels intended for exterior uses in the motor vehicle sector. These panels may comprise or include, for example, glass elements such as (window) panes or sliding roofs or headlamps. As a result of the deep black gloss look, the pane area appears to be enlarged, since the roof, for example a panorama roof, has an all-glass appearance. It is also possible to manufacture decorative panels from this material. Also meant are intervening pieces which optically connect glass units. And likewise intervening pieces between the A and B pillar in the automobile sector. Optionally, stiffening elements, mounting aids and areas to accommodate the adhesive bead are molded onto the frame, in order to enable corresponding easy assembly. In addition, a specific shape, such as a specific 3-dimensional shape, may be present. Since the frames are relatively large and have a complex geometry, the thermoplastic material must have sufficient flowability to be processable in the injection molding process, for example specifically the injection-compression molding process, to give corresponding shaped bodies.

The material is also suitable for frames or housings which are used in the electricals or multimedia sector. Examples here would be, for example, television frames, laptop housings, lamp covers, etc.

Suitable polycarbonates for the production of the inventive polymer composition are all known polycarbonates. These are homopolycarbonates, copolycarbonates and thermoplastic polyester carbonates.

The suitable polycarbonates preferably have mean molecular weights $\overline{M}_w$ of 10 000 to 50 000 g/mol, preferably of 14 000 to 40 000 g/mol and especially of 16 000 to 32 000 g/mol, and most preferably of 24 000 to 31 000 g/mol, determined by gel permeation chromatography with polycarbonate calibration. The polycarbonates are preferably prepared by the interfacial process or the melt transesterification process, of which there are many descriptions in the literature.

With regard to the interfacial process, reference is made by way of example to H. Schnell, "Chemistry and Physics of Polycarbonates", Polymer Reviews, Vol. 9, Interscience Publishers, New York 1964 p. 33 ff., to Polymer Reviews, Vol. 10, "Condensation Polymers by Interfacial and Solution Methods", Paul W. Morgan, Interscience Publishers, New York 1965, ch. VIII, p. 325, to Dres. U. Grigo, K. Kircher and P. R. Müller "Polycarbonate" [polycarbonates] in Becker/Braun, Kunststoff-Handbuch [Plastics Handbook], volume 3/1, Polycarbonate, Polyacetale, Polyester, Celluloseester [polycarbonates, polyacetals, polyesters, cellulose esters], Carl Hanser Verlag Munich, Vienna 1992, p. 118-145, and to EP 0 517 044 A1.

The melt transesterification process is described, for example, in Encyclopedia of Polymer Science, Vol. 10 (1969), Chemistry and Physics of Polycarbonates, Polymer Reviews, H. Schnell, Vol. 9, John Wiley and Sons, Inc. (1964), and in the patent specifications DE-B 10 31 512 and U.S. Pat. No. 6,228,973.

The polycarbonates are preferably prepared by reaction of bisphenol compounds with carbonic acid compounds, especially phosgene, or in the melt transesterification process with diphenyl carbonate or dimethyl carbonate.

Particular preference is given here to homopolycarbonates based on bisphenols A and copolycarbonates based on the monomers bisphenol A and 1,1-bis(4-hydroxyphenyl)-3,3,5-trimethylcyclohexane.

These and further bisphenol and diol compounds which can be used for the polycarbonate synthesis are disclosed, inter alia, in WO 2008037364 A1 (page 7 line 21 to page 10 line 5), EP 1 582 549 A1 ([0018] to [0034]), WO 2002026862 A1 (page 2 line 20 to page 5 line 14), WO 2005113639 A1 (page 2 line 1 to page 7 line 20).

The polycarbonates may be linear or branched. It is also possible to use mixtures of branched and unbranched polycarbonates.

Suitable branching agents for polycarbonates are known from the literature and are described, for example, in the patent specifications U.S. Pat. No. 4,185,009 and DE 25 00 092 A1 (inventive 3,3-bis(4-hydroxyaryl)oxindoles, see whole of each document), DE 42 40 313 A1 (see page 3 lines 33 to 55), DE 19 943 642 A1 (see page 5 lines 25 to 34) and U.S. Pat. No. 5,367,044 and literature cited therein.

In addition, the polycarbonates used may also be intrinsically branched, in which case no branching agent is added in the course of polycarbonate preparation. One example of intrinsic branches is what are called Fries structures, as disclosed for molten polycarbonates in EP 1 506 249 A1.

In addition, it is possible to use chain terminators in the polycarbonate preparation. Chain terminators used are preferably phenols such as phenol, alkylphenols such as cresol and 4-tert-butylphenol, chlorophenol, bromophenol, cumylphenol or mixtures thereof.

The polymer composition for the inventive base layer comprising the abovementioned components is produced by standard incorporation methods, through combination, mixing and homogenization, with the homogenization in particular preferably taking place in the melt under the action of shear forces. Optionally, the combination and mixing precedes the melt homogenization, using powder premixtures.

It is also possible to use premixtures which have been produced from solutions of the mixture components in suitable solvents, in which case homogenization is optionally effected in solution and the solvent is then removed.

More particularly, it is possible here to introduce the components of the inventive composition by known processes, one being introduction as a masterbatch.

The use of masterbatches and of powder mixtures or compacted premixtures is especially suitable for introduction of the abovementioned components. It is optionally possible here to premix all the aforementioned components. Alternatively, premixtures of the components are also possible. In all cases, for better meterability in the production of the thermoplastic polymer compositions, the aforementioned component premixtures are preferably made up with the pulverulent polymer component, so as to form overall volumes that can be handled efficiently.

In a particular embodiment, the abovementioned components may be mixed together to give a masterbatch, in which case the mixing preferably takes place in the melt under the action of shear forces (for example in a kneader or twin-screw extruder). This process offers the advantage that the components are better distributed in the polymer matrix. The polymer matrix chosen for production of the masterbatch is preferably the thermoplastic polymer which also constitutes the main component of the ultimate overall polymer composition.

In this context, the composition can be combined, mixed, homogenized and then extruded in customary apparatuses such as screw extruders (for example twin-screw extruders, TSE), kneaders, Brabender or Banbury mixers. After the extrusion, the extrudate can be cooled and comminuted. It is also possible to premix individual components and then to add the remaining starting materials individually and/or likewise in a mixture.

In a particular embodiment, the process for producing weathering-stable multilayer polymer moldings having a deep gloss look consists of the following steps:

1. Producing a substrate material comprising polycarbonate having an MVR of 7 cm$^3$/(10 min) to 25 cm$^3$/(10 min), preferably 9 to 21 cm$^3$/(10 min), to ISO 1133 (at 300° C. and load 1.2 kg), comprising the inventive colorant combination of component A, optionally component B and C, optionally further components.
2. Producing a molding in a specific framework geometry in an injection molding process or injection-compression process.
3. Coating the molding in a flow-coating process with a primer solution comprising
a) organic binder material which enables adhesion between PC and a polysiloxane-based coating material,
b) at least one UV absorber,
c) an alcohol-based solvent.
Venting the component at room temperature for 10-60 min and curing at 100-135° C. for 5 min to 60 min.
4. Coating the molding with a siloxane coating material in a flow-coating process comprising
a) organosilicon compounds of the formula $R_nSiX_{4-n}$ (with n from 1 to 4) where R represents aliphatic C1 to C10 radicals, preferably methyl, ethyl, propyl, isopropyl, butyl and isobutyl, and aryl radicals, preferably phenyl, and substituted aryl radicals and X is H, aliphatic C1 to C10 radicals, preferably methyl, ethyl, propyl, isopropyl, butyl and isobutyl, and aryl radicals, preferably phenyl, substituted aryl radicals, or is OH, Cl, or partial condensates thereof, b) finely divided inorganic compound, preferably $SiO_2$.
c) an alcohol-based solvent,
d) at least one UV absorber.
Venting the component at room temperature for 10-60 min and curing at 100-140° C. for 10 min to 120 min.

The inventive polymer compositions can be processed to give products or moldings by, for example, first extruding the polymer compositions as described to give pellets and processing these pellets by suitable methods to give various products or moldings in a known manner.

In this context, the inventive compositions can be converted to products, moldings or shaped articles, for example, by hot pressing, spinning, blow-molding, thermoforming, extrusion or injection molding. Preference is given here to injection molding or injection-compression molding.

Injection molding processes are known to those skilled in the art and are described, for example, in "Handbuch Spritzgiessen" [Injection Molding Handbook], Friedrich Johannnaber/Walter Michaeli, Munich; Vienna: Hanser, 2001, ISBN 3-446-15632-1 or "Anleitung zum Bau von Spritzgiesswerkzcugen" [Guide to Building Injection Molds], Menges/Michaeli/Mohren, Munich; Vienna: Hanser, 1999, ISBN 3-446-21258-2.

Extrusion processes are known to those skilled in the art and are described, for example, for coextrusion in EP-A 0 110 221, EP-A 0 110 238 and EP-A 0 716 919 inter alia. For details of the adapter and nozzle process, see Johannaber/Ast: "Kunststoff-MaschinenfiUhrer" [Guide to Plastics Processing Machinery], Hanser Verlag, 2000 and in Gesellschaft Kunststofflechnik: "Coextrudierte Folien and Platten: Zukunftsperspektiven, Anforderungen, Anlagen und Herstellung, Qualitätssicherung" [Coextruded Films and Sheets: Future Perspectives, Requirements, Plants and Production, Quality Assurance], VDI-Verlag, 1990.

The coating can be produced via various methods. For example, coating can be effected via various methods of vapor deposition, for example via electron beam methods, resistance heating, and via plasma deposition or various sputtering methods such as high-frequency sputtering, magnetron sputtering, ion beam sputtering, etc., ion plating by means of DC, RF, HCD methods, reactive ion plating, etc., or chemical gas phase deposition.

As well as the abovementioned preferred process, there are thus various methods for producing a scratch-resistant coating on plastics articles. For example, it is possible to use epoxy-based, acryloyl-based, polysiloxane-based, colloidal silica gel-based or inorganic/organic-based (hybrid system-based) coating materials. These systems can be applied, for example, by dipping methods, spin-coating, spraying methods or flow-coating. The curing can be effected thermally or by means of UV irradiation. It is possible to use single-layer or multilayer systems. The scratch-resistant coating can be applied, for example, directly or after preparing the substrate surface with a primer. In addition, a scratch-resistant coating can be applied via plasma-assisted polymerization processes, for example via an $SiO_2$ plasma. Anti-fogging or anti-reflection coatings can likewise be produced via plasma processes. In addition, it is possible to apply a scratch-resistant coating to the resulting shaped body via particular injection molding processes, for example the insert molding of surface-treated films. Various additives, for example UV absorbers derived, for example, from triazoles or triazines, may be present in the scratch-resistant layer. It is also possible for organic or inorganic IR absorbers to be present. These additives may be present in the scratch-resistant coating material itself or in the primer layer. The thickness of the scratch-resistant layer is 1-20 μm, preferably 2-15 mm. Below 1 μm, the stability of the scratch-resistant layer is inadequate. Above 20 μm, the frequency of cracks in the coating material increases.

For polycarbonates, preference is given to using a primer containing UV absorber, in order to improve the adhesion of the scratch-resistant coating material. The primer may comprise further stabilizers, for example HALS systems (stabilizers based on sterically hindered amines), adhesion promoters, flow auxiliaries. The particular resin may be selected from a multitude of materials and is described, for example, in Ullmann's Encylopedia of Industrial Chemistry, 5th Edition, Vol. A18, pp. 368-426, VCH, Weinheim 1991. It is possible to use polyacrylates, polyurethanes, phenol-based, melamine-based, epoxy systems and alkyd systems, or mixtures of these systems. The resin is usually dissolved in suitable solvents—frequently in alcohols. Depending on the resin chosen, the curing can be effected at room temperature or at elevated temperatures. Preference is given to using temperatures between 50° C. and 130° C.—frequently after a majority of the solvent has been removed over a short period at room temperature. Commercially available systems are, for example, SHP470, SHP470FT and SHP401 from Momentive Performance Materials. Coatings of this kind are described, for example, in U.S. Pat. No. 6,350,512 B1, U.S. Pat. No. 5,869,185, EP 1308084, WO 2006/108520.

Scratch-resistant coating materials (hardcoats) are preferably formed from siloxanes and preferably contain UV absorbers. They are preferably applied via dipping or flow-coating processes. The curing is effected at temperatures of 50° C.-130° C. Commercially available systems are, for example, AS4000, SHC5020 and AS4700 (CAS: 857052-28-9) from Momentive Performance Materials. Systems of this kind are described, for example, in U.S. Pat. No. 5,041,313, DE 3121385, U.S. Pat. No. 5,391,795, WO 2008/109072. These materials are usually synthesized via condensation of alkoxy- and/or alkylalkoxysilanes under acid or base catalysis. It is optionally possible to incorporate nanoparticles. Preferred solvents are alcohols such as butanol, isopropanol, methanol, ethanol and mixtures thereof.

Rather than primer/scratch-resistant coating combinations, it is possible to use single-component hybrid systems. These are described, for example, in EP0570165 or WO 2008/071363 or DE 2804283. Commercially available hybrid systems are available, for example, under the PHC587 or UVHC 3000 names from Momentive Performance Materials.

In a particularly preferred embodiment, the primer used is an adhesion-promoting UV protection primer based on polymethylmethacrylate, containing 1-methoxy-2-propanol and diacetone alcohol as solvent and a UV absorber combination comprising dibenzoylresorcinol and a triazine derivative. In a particularly preferred embodiment, the topcoat is especially preferably a polysiloxane topcoat composed of a sol-gel condensate of methyltrimethylsilane with silica sol, comprising a silylated UV absorber.

The UV absorber in the primer layer is preferably UV absorber selected from the group of those mentioned under d), preferably from the class of the biphenyltriazines, especially preferably 2-[2-hydroxy-4-[(octyloxycarbonyl)ethylideneoxy]phenyl-4,6-di(4-phenyl)phenyl-1,3,5-triazine.

The concentration of the UV absorber or the UV absorber mixture in the primer layer is between 5% by weight and 50% by weight, preferably between 15% by weight and 40% by weight.

In a particularly preferred process, the coating material is applied via the flow-coating process, since it leads to coated parts having high optical quality.

The flow-coating process can be effected manually with a hose or suitable coating head, or automatically in a continuous run by means of flow-coating robots and optionally slot dies.

It is possible here to coat the components while they are either suspended or held in an appropriate product carrier.

In the case of relatively large and/or 3D components, the part to be coated is suspended or positioned in a suitable product carrier.

In the case of small parts, the coating can also be conducted manually. This involves pouring the liquid primer or coating material solution to be layered, proceeding from the upper edge of the small part, over the sheet in longitudinal direction, while, at the same time, the application point of the coating material to the sheet is moved from left to right over the sheet width. The coated sheets are vented and cured while hanging vertically, suspended from a clamp, according to the respective manufacturer's instructions.

The inventive multilayer structures can be used with particular preference as frames for window modules for automobiles, rail vehicles and aircraft. Other frame parts are also preferred.

EXAMPLES

The invention is described in detail hereinafter with reference to working examples, the determination methods described here being employed for all the corresponding parameters in the present invention, unless stated otherwise.

Melt Volume Flow Rate:

Melt volume flow rate (MVR) is determined to ISO 1133 (at 300° C.; 1.2 kg).

Light transmission (Ty):

The transmission measurements were conducted to ISO 13468-2 on a Perkin Elmer Lambda 900 spectrophotometer with photometer sphere (i.e. determination of total transmission by measurement of diffuse transmission and direct transmission).

Weathering:

Artificial weathering with xenon exposure is conducted to standard ASTM G 155 in an Atlas CI 5000 xenon weatherometer. The UV filters used were two borosilicate filters. The exposure intensity is 0.75 W/m$^2$/nm at 340 nm. The black standard temperature is 80° C., the sample space temperature is 40° C. The samples are sprayed every 120 min for 18 min, with the exposure remaining switched on during the spraying phase as well. The aforementioned weathering method is called Xe-Wom 0.75W hereinafter.

Materials for Production of the Test Specimens:

Linear bisphenol A polycarbonate having end groups based on phenol, having an MVR of 12.5 cm$^3$/10 min, measured at 300° C. and load 1.2 kg to ISO 1033), containing 0.025% by weight of triphenylphosphine (CAS 603-35-0) and 0.40% by weight of pentaerythritol tetrastearate (CAS 115-83-3), referred to hereinafter as PC1.

For the comparative examples, the nanoscale carbon black used—in the masterbatch as well—is Black Pearls® 800 (CAS No. 1333-86-4) (particle size about 17 nm) from Cabot Corp.

For the inventive example, the colorant used is of the structure (1H) Macrolex Violet 3R from Lanxess AG.

For the inventive example, the colorant used is of the structure (1C) Macrolex Green 5B from Lanxess AG.

Painting of the Test Specimens:

The primer used is the product SHP470FT (Momentive Performance Materials Inc. Wilton, Conn. USA). The protective varnish used is the product AS 4700 (Momentive Performance Materials Inc. Wilton, Conn. USA).

The coating was effected in a climate-controlled coating chamber following the respective instructions from the coating material manufacturer at 23 to 25° C. and 40% to 48% relative humidity.

The test specimens were cleaned with Iso wipes (LymSat® from LymTech Scientific; saturated with 70% isopropanol and 30% deionized water), rinsed with isopropanol, dried under air for 30 min and blown dry with ionized air.

The test specimens were coated manually by the flow-coating process. This involves pouring the primer solution, proceeding from the upper edge of the small part, over the sheet in the longitudinal direction, while, at the same time, the application point of the primer to the sheet is moved from left to right over the sheet width. The primed sheet was vented until it was dust-dry and cured in an air circulation oven while hanging vertically, suspended from a clamp, according to the respective manufacturer's instructions (vented at room temperature for 30 minutes and cured at 125° C. for 30 minutes). After cooling to room temperature, the primed area was coated with AS 4700. Venting to dust-dryness was followed by curing at 130° C. in an air circulation oven for 60 min.

The primer layer thickness and the thickness of the topcoat can affect the weathering properties.

In order to achieve an adequate and comparable barrier action against weathering, the primer layer thickness for the examples which follow is to be in the range of 1.2-4.0 μm and the thickness of the topcoat between 4.0 and 8.0 μm.

Production of Thermoplastic Polymer Compositions by Compounding:

The polymer composition was compounded with the amounts of components specified in the examples on a KraussMaffei Berstorff ZE25 twin-screw extruder at a casing temperature of 260° C. and a melt temperature of 270° C. and a speed of 100 rpm at a throughput of 10 kg/h.

The pellets are dried at 120° C. under reduced pressure for 3 hours and then processed on an Arburg 370 injection molding machine having a 25 injector unit at a melt temperature of 300° C. and a mold temperature of 90° C. to give color specimen sheets having dimensions 60 mm×40 mm×3.2 mm.

Example 1 (Inventive)

PC1 is compounded as described above with 0.1% by weight of Macrolex Violet 3R and 0.1% by weight of Macrolex Green 5B. The above-described color specimen sheets are produced, and painted and weathered as described.

Example 2 (Comparative)

PC1 is compounded as described above with 0.08% by weight of Black Pearls. The above-described color specimen sheets are produced, and painted and weathered as described.

Example 3 (Comparative)

PC1 is compounded as described above with 0.16% by weight of Black Pearls. The above-described color specimen sheets are produced, and painted and weathered as described.

|  | Example 1 (inventive) | Example 2 (comparative) | Example 3 (comparative) |
| --- | --- | --- | --- |
| Light transmission | 0% | 0% | 0% |
| Finding after 5000 h Xe-WOM 0.75 W weathering | No defects | No defects | Cracks; commencement of delamination of the paint layer |
| Finding after 6000 h Xe-WOM 0.75 W weathering | No defects | Large-area delamination of the paint layer | Large-area delamination of the paint layer |

It is apparent that the inventive multilayer structure has a much higher weathering resistance than multilayer structures corresponding to the prior art.

The invention claimed is:

1. A multilayer structure having high weathering stability comprising
   a) a substrate layer having a light transmission (ISO 13468-2) of less than 1.0% and containing at least one thermoplastic polymer,
   b) an outer layer at least on one side of the substrate layer, wherein
   the substrate layer further comprises:
   a1) 0.02% by weight to 0.2% by weight of at least one anthraquinone-based colorant of the structure (1) or (2) with structure (1)

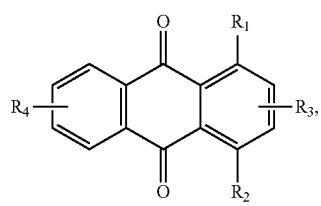

(1)

where $R_1$ and $R_2$ are each independently H, OH, $OR^5$, $NH_2$ or $NHR^5$, where $R^5$ is alkyl, cycloalkyl, phenyl or substituted and fused phenyls and
where $R_3$ is H, alkyl or alkoxy and
where $R_4$ is H, OH or p-methylphenyl-NH—;
and with
structure (2):

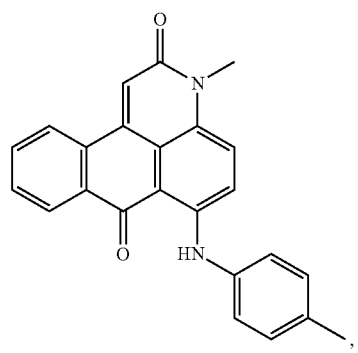

(2)

a2) 0.01% by weight to 1.00% by weight of one or more demolding agents, and the outer layer consists of a polysiloxane-based or polyacrylate-based or polyurethane acrylate-based coating and contains at least one UV absorber and has a layer thickness of 2-15 µm.

2. The multilayer structure as claimed in claim 1, wherein the dye a1) is selected from the group consisting of structures 1A to 1H

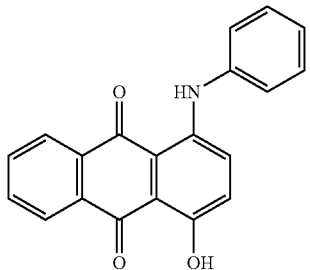

(1A)

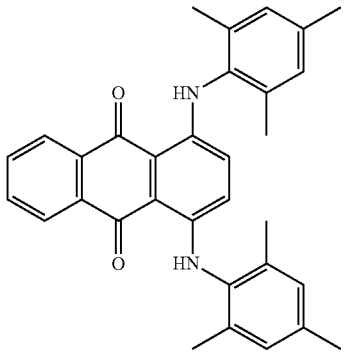

(1B)

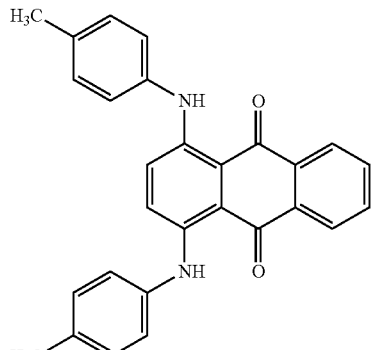

(1C)

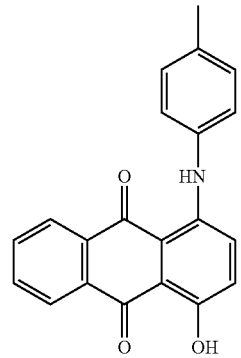

(1D)

-continued (1E)
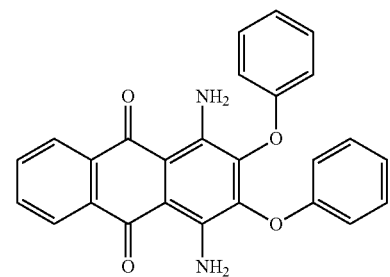

(1F)
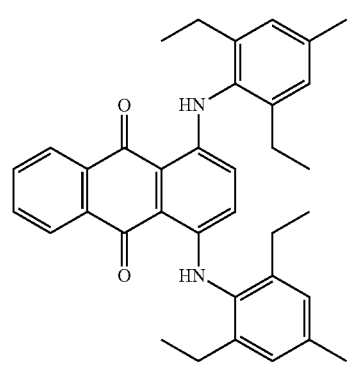

(1G)
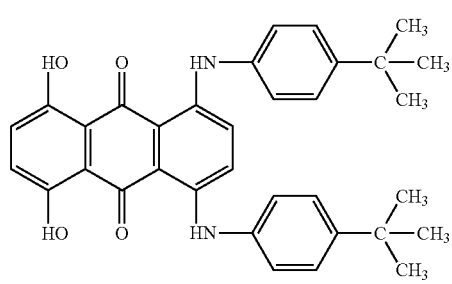

(1H)
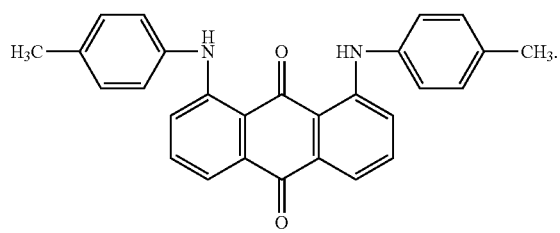

3. The multilayer structure as claimed in claim 1, wherein the substrate layer a) further comprises at least one dyes selected from the group consisting of structures (3) to (7)

(3)
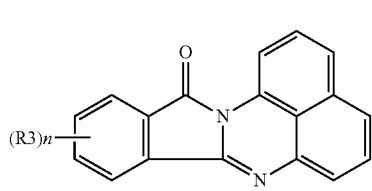

where R3 is halogen,
where n is an integer of 0-4 and, (4)
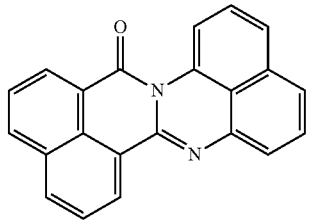

(5a)
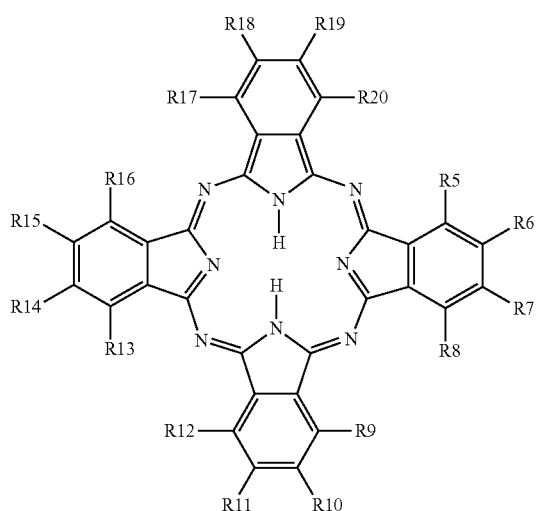

(5b)
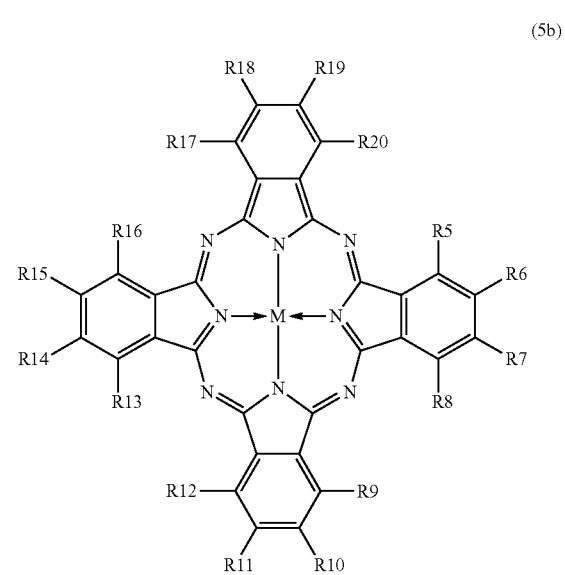

R5-R20 radicals are each independently hydrogen, methyl, ethyl, propyl, isopropyl, butyl, isobutyl, tert-butyl, pentyl, neopentyl, hexyl, thexyl, fluorine, chlorine, bromine, sulfone or CN, M is aluminium, cobalt, iron, zinc, copper or manganese, (6)

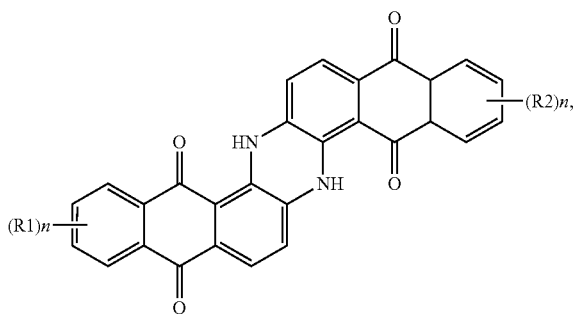

where
R1 and R2 are each independently a linear or branched alkyl radical or halogen,
n is a natural number from 0 to 4

(7)

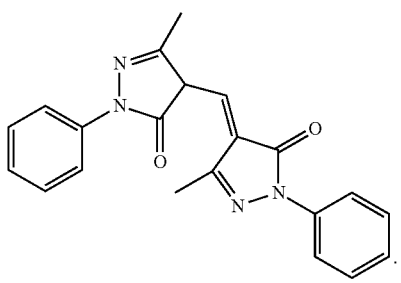

4. The multilayer structure as claimed in claim 2, wherein the substrate layer comprises one dye of the structure (1C) and one dye selected from the group consisting of structures (1H), (1G), (1D) and (2).

5. The multilayer structure as claimed in claim 1, wherein the substrate layer is free of carbon black and perinone-based dyes.

6. The multilayer structure as claimed in claim 1, wherein the substrate layer further comprises the following components:
   a3) at least one thermal stabilizer in a proportion of 0.00% by weight-0.20% by weight,
   a4) at least one processing stabilizer in a positive proportion of less than 0.05% by weight,
   a5) at least one UV absorber in a proportion of 0.0% to 20.0% by weight, and
   a6) at least one further additive in a proportion of 0.0% by weight to 5.0% by weight.

7. The multilayer structure as claimed in claim 1, wherein the substrate layer further comprises the following components:
   a3) at least one thermal stabilizer in a proportion of 0.01% by weight-0.10% by weight,
   a4) at least one processing stabilizer in a proportion of 0.00005% by weight to 0.05000% by weight,
   a5) at least one UV absorber in a proportion of 0.10% to 1.00% by weight, and
   a6) at least one further additive in a proportion of 0.01% by weight to 1.00% by weight.

8. The multilayer structure as claimed in claim 1, wherein the thermoplastic polymer in the substrate layer is a polycarbonate or a polycarbonate blend containing vinyl (co)polymers or polyesters.

9. The multilayer structure as claimed in claim 6, wherein component a4) is triisooctyl phosphate.

10. The multilayer structure as claimed in claim 1, wherein the outer layer is a polysiloxane-based coating.

11. The multilayer structure as claimed in claim 1, wherein the outer layer has a thickness of 4.0 to 12.0 μm.

12. The multilayer structure as claimed in claim 1, wherein an outer layer is disposed on both sides of the substrate layer.

13. The multilayer structure as claimed in claim 1, wherein a primer layer is disposed between the outer layer and substrate layer.

14. The multilayer structure as claimed in claim 13, wherein the primer layer has a thickness of 0.3 μm to 8.0 μm.

15. A process for producing a multilayer structure, wherein the process comprises the following steps:
   producing a substrate material comprising polycarbonate having a light transmission (ISO 13468-2) of less than 1.0% and a melt volume flow rate (MVR) of 7 cm³/10 min to 25 cm³/10 min comprising
   a1) 0.02% by weight to 0.2% by weight of at least one anthraquinone-based colorant of the structure (1) or (2) with
   structure (1)

(1)

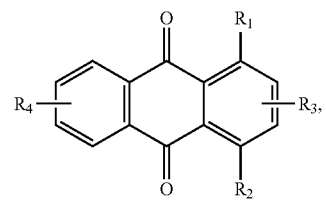

where $R_1$ and $R_2$ are each independently H, OH, $OR^5$, $NH_2$ or $NHR^5$,
where $R^5$ is alkyl, cycloalkyl, phenyl or substituted and fused phenyls and
where $R_3$ is H, alkyl or alkoxy and
where $R_4$ is H, OH or p-methylphenyl-NH—;
and with
structure (2):

(2)

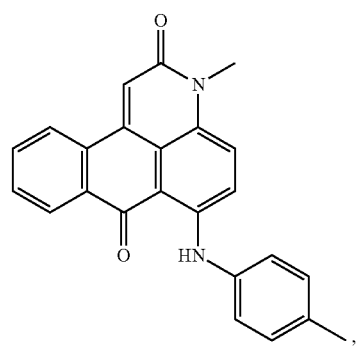

a2) 0.01% by weight to 1.00% by weight of one or more demolding agents and optionally components a3) to a6);
a3) at least one thermal stabilizer,

- a4) at least one processing stabilizer,
- a5) at least one UV absorber,
- a6) at least one further additive producing a molding in a specific framework geometry at high mold temperatures;

coating the molding in a flow-coating process with a primer solution comprising
- a) organic binder material which enables adhesion between PC and a polysiloxane-based coating material, and
- b) at least one UV absorber,
- c) an alcohol-based solvent, venting the molding at room temperature for 10-60 min and curing at 100-135° C. for 5 min to 60 min., coating the molding with a siloxane coating material in a flow-coating process comprising
- a) organosilicon compounds of the formula $R_nSiX_{4-n}$ (with n from 1 to 4), where R represents aliphatic C1 to C10 radicals and aryl radicals, and X is H, aliphatic C1 to C10 radicals and aryl radicals, or partial condensates thereof,
- b) at least one finely divided inorganic compound,
- c) an alcohol-based solvent,
- d) at least one UV absorber; and venting the molding at room temperature for 10-60 min and curing at 100-140° C. for 10 min to 120 min.

* * * * *